United States Patent Office 3,509,769
Patented May 5, 1970

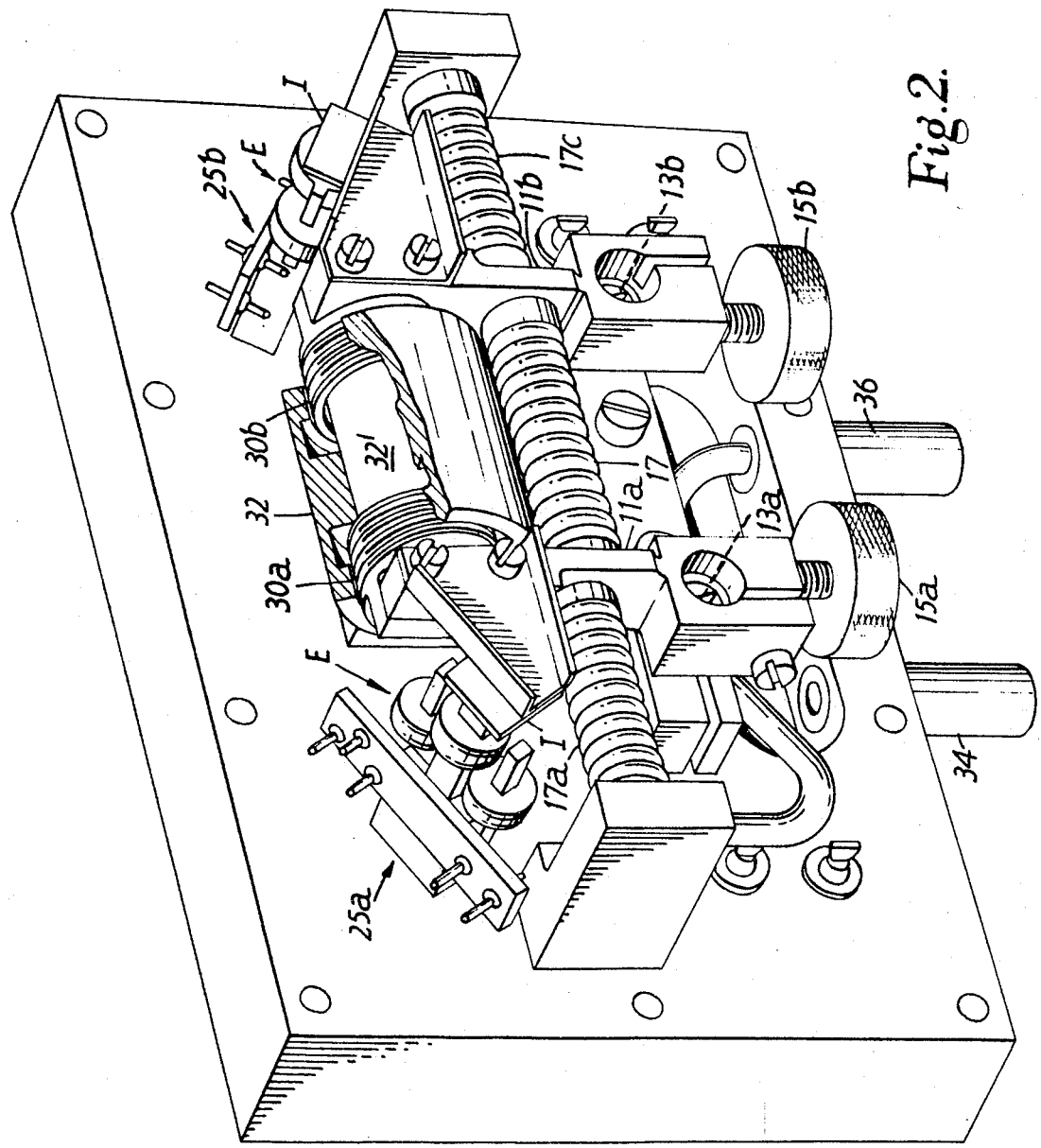

3,509,769
DIFFERENTIAL PRESSURE TRANSDUCER
Stafford M. Ellis and Richard P. G. Collinson, London, England, assignors to Elliott Brothers (London) Limited, London, England
Filed Feb. 26, 1968, Ser. No. 708,205
Claims priority, application Great Britain, Mar. 16, 1967, 12,362/67
Int. Cl. G01l 7/06, 9/10, 9/14
U.S. Cl. 73—398      5 Claims

ABSTRACT OF THE DISCLOSURE

A fluid pressure transducer which has two substantially rigid members which are rotatable in opposite senses through substantially equal angles around axes of rotation which are parallel. The rotation is in response to pressure differentials which are to be measured. The rigid members are also rotatable in the same sense as each other through substantially equal angles around said axes of rotation in response to acceleration in a direction perpendicular to said axes.

---

Figure 1:
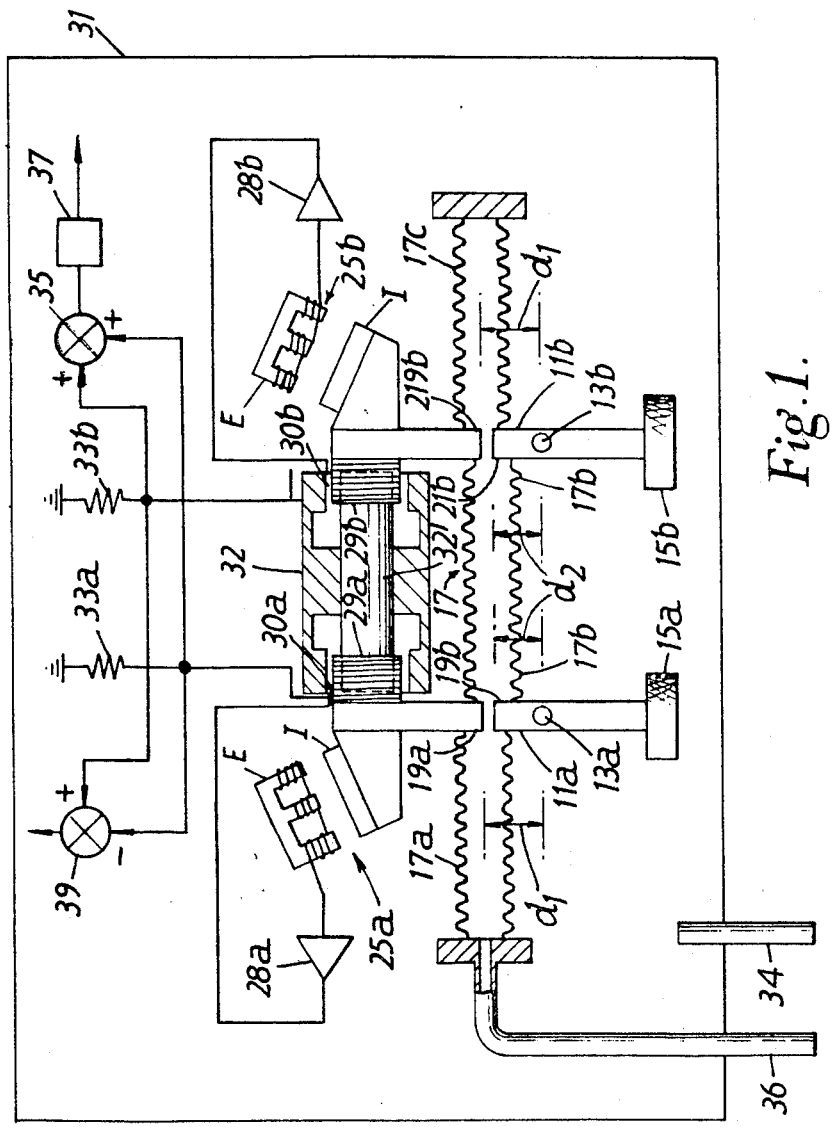

This invention relates to fluid pressure transducers which measure either total or differential fluid pressure.

In accordance with the invention, in such a transducer two substantially rigid members rotate in opposite senses through substantially equal angles about parallel pivot axes in response to pressure differentials to be measured, and rotatable in the same sense through substantially equal angles about the pivot axes under acceleration in a direction perpendicular to the pivot axes.

Preferably, the rigid members are substantially balanced with respect to their respective pivot axes so as to minimise rotation of the members about their pivot axes under said acceleration.

Preferably, the transducer comprises, in respect of each rigid member, bellows means by which, in response to a pressure differential between the interior and exterior of the bellows means, substantially equal and opposite forces tending to rotate the rigid member about its pivot axis are applied to opposite surfaces of the member at different distances from the pivot axis of the member; and in which, in operation, the interior of the bellows means receive the same one of the fluid pressures whose differential is to be measured.

Preferably, also, the bellows means associated with each member includes bellows means, located between opposed surfaces of the members so as, in response to a pressure differential between the interior and the outside of the bellows exerts substantially equal and opposite forces on the members.

In a hereinafter described embodiment, each member carries a part of a pickoff which is included in a force balance feedback loop and which is sensitive to movement away from a balance position of the rigid member associated therewith, and signals indicative of force applied to the rigid members by the feedback loops in order to maintain the members at the balance position, are supplied to a monitoring arrangement operative to indicate or to develop a signal indicative of any difference between forces so applied or to a summing and halving arrangement operative to indicate or to develop a signal indicative of the mean forces so applied, or to both such difference monitoring and summing and halving arrangements.

The invention is hereinafter described with reference to the accompanying drawings, in which:

FIG. 1 is a schematic diagram of a preferred embodiment of the invention showing differential fluid pressure transducers included in a force balance system; and FIG. 2 is a perspective view of part of the transducer.

The transducer has two substantially rigid members 11a, 11b, which rotate in opposite senses, i.e. one clockwise, the other counterclockwise, through substantially equal angles about parallel pivot axes 13a, 13b, in response to pressure differentials to be measured, and in the same sense, i.e. both clockwise, or both counterclockwise, about the pivot axes 13a, 13b, under acceleration in a direction perpendicular to the pivot axes as a result of out of balance moments which act on the arms of the members 11a, 11b, under such acceleration.

Unbalance in the members 11a, 11b, is undesirable in that relatively large countermoments must needs be applied to the arms of the members in order to maintain the members in a balance position. The degree of unbalance is minimised, so far as possible, by carefully adjusted balance weights 15a, 15b, attached to the members 11a, 11b.

In respect of the member 11a there are provided bellows 17a, 17b, by which, in response to a differential pressure $(p-s)$ between the interior and exterior of the bellows 17a, 17b, substantially equal and opposite fluid pressure forces are applied to opposite surfaces 19a, 19b, of the member 11a, at different mean distances $d_1$, $d_2$ from the pivot axis 13a. Similarly in respect of the member 11b, there are bellows 17b, 17c, by which, in response to the differential pressure $(p-s)$ substantially equal and opposite fluid pressure forces are applied to opposite surfaces 21a, 21b, of the member 11b at different distances from the pivot axis 13b. The difference between the last mentioned distances is substantially the same as the difference $(d_1-d_2)$ between the distances $d_1$, $d_2$ from the pivot axis 13a.

In the embodiment illustrated, the bellows 17b are shown as a unitary bellows 17 which is located between opposed surfaces 19b, 21b, of the members 11a, 11b, respectively so as, in response to a pressure differential between the interior and the outside of the bellows 17, to apply equal and opposite fluid pressure forces to the members 11a, 11b.

The bellows 17, 17a, and 17c are produced by a "lost wax" process in which nickel is electro-deposited on a "wax" model of the bellows, the wax model being subsequently removed. The walls of the bellows have a thickness of the order 0.002".

The members 11a, 11b, each carry one part, I, of an E–I inductive pickoff 25a, 25b, another part E of which is included in a force balance feedback loop 27a, 27b. Each loop 27a, 27b comprises an amplifier 28a, 28b, and an electrical coil and former 29a, 29b, attached to members 11a and 11b, respectively and moving in annular flux gaps 30a, 30b, formed by a permanent magnet comprising an outer part 32 and an inner part 32'.

The members 11a, 11b; bellows 17a, 17c; the pickoffs 25a, 25b; and the coils 29a, 29b, are all within an enclosure 31 which is, in operation, maintained at static air pressure via inlet 34. The bellows 17, 17a, 17c are connected to a source of pitot pressure by way of inlet 36.

When the pitot and static pressures are substantially equal the members 11a, 11b are at a balance position at which the E–I pickoffs 25a, 25b develop no output signal.

In response to differential pitot-static pressure, there is a tendency for the members 11a, 11b to move away from balance. Any small movement of the latter members away from balance gives rise to signals at the outputs of the pickoffs 25a, 25b.

These signals are, after amplification by the amplifiers 28a, 28b applied to the electrical coils 29a, 29b in a sense such that interaction between the electrical coils and the permanent magnet 32, 32', restores the members 11a, 11b to the balance position. It will therefore be seen that the members 11a, 11b are allowed barely to deviate from the balance position.

The electrical coils 29a, 29b are connected to resistors 33a, 33b so as to develop voltages proportional to currents flowing in the windings, that is to say, to the pitot-static pressure differential prevailing at any instant.

The voltages developed by the resistors 33a, 33b are applied to a voltage summing device 35; and the output of a latter device is applied to a voltage halving device 37. The output of the halving device represents the mean value of the signals, indicative of pitot-static differential pressure as represented by currents flowing in the windings of the individual coils 29a, 29b.

The voltages developed by the resistors 33a, 33b are also applied to a monitoring device 39 which develops an output representing the difference between the latter voltages and, hence, the difference between the pitot-static pressure differential as represented by currents flowing in the individual coils 29a, 29b.

The amplifiers 28a, 28b are fed from independent power supplies and care is taken to guard against the possibility of electrical contact between the electrical connections.

The monitoring device 39 is thus able to detect the development of any of the following faults:

(a) Open or short circuit in the output in either one of the amplifiers 28a, 28b, an open or short circiut in either of the coils 29a, 29b, an open or short circuit in either of the pickoffs 25a, 25b, or an open or short circuit in either of the read-out resistors 33a 33b;

(b) Shorted turns in either of the coils 29a, 29b;

(c) A change in either of the read-out resistors 33a, 33b;

(d) Loss of magnetic field strength in the permanent magnet 32, 32';

(e) A zero output or a "Hard over" output from either of the amplifiers 28a, 28b; and (f) Offset or bias error at either of the transducer outputs.

We claim:

1. A fluid pressure transducer comprising two substantially rigid members rotatable about parallel pivot axes and being rotatable in the same sense through substantially equal angles about the pivot axes under acceleration in a direction perpendicular to the pivot axes; and two bellows means comprising a first bellows extending between a fixed support and a first area on one side of one of the rigid members, a second bellows common to the two bellows means extending from a second area on the other side of said one rigid member to a third area on one side of the other rigid member, and a third bellows extending from a fourth area on the other side of said other rigid member to another fixed support, the second and third areas being a first distance from the pivot areas and the first and fourth areas being a second distance from the pivot areas, all the said areas being equal and all the bellows being subject to the same pressure.

2. A transducer as claimed in claim 1 included in a force-balance system, the system comprising a pick-off for each member sensitive to movement away from the balance position of the member, a feedback loop for each member including the pick-off and means for adjusting the position of the member to maintain it at the balance position.

3. A transducer in a system as claimed in claim 2 wherein there are provided means for deriving signals indicative of force applied to the rigid members by the feed-back loops in order to maintain the members at their balance positions, and a monitoring arrangement supplied with said signals and effective to develop an output signal indicative of any difference between said forces.

4. A transducer in a system as claimed in claim 2 wherein there are provided means for deriving signals indicative of force applied to the rigid members by the feed-back loops in order to maintain the members at their balance positions, and summing means for summing the signals and giving an indication proportional to the sum of the forces.

5. A transducer in a system as claimed in claim 4 wherein the summing means includes halving means for halving the value of the summed signals and giving an output indicative of the means of the forces.

References Cited

UNITED STATES PATENTS

| 2,694,927 | 11/1954 | Coulbourn | 73—398 X |
| 2,946,031 | 7/1960 | Steele. | |
| 3,249,760 | 5/1966 | Miller | 73—398 X |

S. CLEMENT SWISHER, Primary Examiner

U.S. Cl. X.R.

73—407